(12) United States Patent
Deng et al.

(10) Patent No.: US 11,531,747 B2
(45) Date of Patent: Dec. 20, 2022

(54) METHOD FOR EXCHANGING DATA BETWEEN A WEB BROWSER AND AN APPLICATION

(71) Applicant: Beijing Didi Infinity Technology And Development Co., Ltd., Beijing (CN)

(72) Inventors: Shengyong Deng, Mountain View, CA (US); Qingdi Liu, Mountain View, CA (US); Chandrasekhar Rentachintala, Mountain View, CA (US)

(73) Assignee: Beijing Didi Infinity Technology and Development Co., Ltd., Beijing (CN)

( * ) Notice: Subject to any disclaimer, the term of this patent is extended or adjusted under 35 U.S.C. 154(b) by 162 days.

(21) Appl. No.: 16/572,336

(22) Filed: Sep. 16, 2019

(65) Prior Publication Data
US 2021/0081521 A1 Mar. 18, 2021

(51) Int. Cl.
| | |
|---|---|
| *H04L 29/06* | (2006.01) |
| *G06F 21/44* | (2013.01) |
| *H04L 67/02* | (2022.01) |
| *G06F 9/455* | (2018.01) |
| *G06F 21/31* | (2013.01) |

(52) U.S. Cl.
CPC .......... *G06F 21/44* (2013.01); *G06F 9/45529* (2013.01); *G06F 21/31* (2013.01); *H04L 67/02* (2013.01)

(58) Field of Classification Search
CPC ......... H04L 63/08; H04L 67/02; G06F 21/44; G06F 21/31
See application file for complete search history.

(56) References Cited

U.S. PATENT DOCUMENTS

| | | | |
|---|---|---|---|
| 2005/0243778 A1 | 11/2005 | Wang et al. | |
| 2006/0173844 A1 | 8/2006 | Zhang et al. | |
| 2011/0302412 A1* | 12/2011 | Deng ................. | H04L 63/0407 713/155 |
| 2012/0254959 A1 | 10/2012 | Schmidt et al. | |
| 2013/0227424 A1 | 8/2013 | Hall et al. | |
| 2013/0269019 A1* | 10/2013 | Garmark .............. | G06F 21/335 726/9 |
| 2014/0047528 A1 | 2/2014 | Schmidt et al. | |
| 2014/0173709 A1* | 6/2014 | Eldar ................... | H04L 63/083 726/7 |
| 2014/0245124 A1* | 8/2014 | Gonzalez ............. | G06F 40/166 715/234 |
| 2014/0344336 A1 | 11/2014 | Lopez et al. | |
| 2015/0065093 A1 | 3/2015 | Schmidt et al. | |
| 2015/0237110 A1 | 8/2015 | Hall et al. | |

(Continued)

*Primary Examiner* — Jason K Gee
(74) *Attorney, Agent, or Firm* — Kilpatrick Townsend & Stockton LLP (57) ABSTRACT

A method of exchanging information with network devices using web browsers includes executing an application on a client device to implement a local web server on the client device, loading in a web browser on the client device a webpage independent of the web browser and including a script for generating a first request to the local web server, accepting the first request from the web browser by the local web server, and sending requested information to the web browser by the local web server. In some embodiments, the method also includes generating a second request to a remote server by the web browser and using the script, where the second request includes the requested information sent to the web browser.

16 Claims, 7 Drawing Sheets

(56) References Cited

U.S. PATENT DOCUMENTS

2016/0073262 A1\* 3/2016 Schmidt .............. H04L 63/0853
 726/7
2020/0252444 A1\* 8/2020 Teglas .................... H04L 69/03

\* cited by examiner

METHOD FOR EXCHANGING DATA BETWEEN A WEB BROWSER AND AN APPLICATION

BACKGROUND

Endpoint or client devices that are Internet-capable may include various computing devices, such as desktop, laptop, or tablet computers, mobile devices, printers, smart televisions, and the like. These endpoint or client devices generally need to comply with certain criteria before they are granted access to a network resource, such as a remote server or another web resource identified by a web address (e.g., a Uniform Resource Locator (URL)). In some implementations, endpoint fingerprinting may be used to monitor and control network access of endpoint devices. For example, the internet protocol (IP) addresses and/or media access control (MAC) addresses of some endpoint devices may be registered with a server or stored in the cloud, and access to a network resource by a given endpoint device may be controlled based upon whether that endpoint device has an IP address, MAC address, or other attributes associated with the endpoint device that match one or more of the stored IP addresses, MAC addresses, and other attributes.

Web browsers may be one of the most commonly used applications by endpoint devices to communicate with the Internet, and thus can play an important role in information security, such as endpoint fingerprinting and user authorization. Many security products, such as anti-virus software, parental control program, URL filtering, and the like, may use browsers to monitor, inspect, log, or control network traffic for security purposes. Thus, the techniques used for exchanging information with the browsers can significantly affect the security, efficiency, and complexity of the information exchange.

BRIEF SUMMARY

Techniques disclosed herein relate generally to exchanging information with network devices using web browsers. More specifically, and without limitation, disclosed herein are techniques for exchanging information between a client device (e.g., an endpoint device or a local host) and a network using a webpage loaded in a browser and a light-weight local web server on the client device. Techniques disclosed herein can enable a web browser to automatically retrieve information associated with the client device from the local web server and send the retrieved information to a remote server for user authentication, authorization, fingerprinting, or the like. Various inventive embodiments are described herein, including devices, systems, methods, non-transitory computer-readable storage media storing programs, code, or instructions executable by one or more processors, and the like.

According to certain embodiments, a method may include executing an application on a client device to implement a local web server on the client device; loading, by a web browser executing on the client device, a webpage independent of the web browser and including a script for generating a first request to the local web server; accepting the first request from the web browser at the local web server; and sending requested information to the web browser by the local web server.

In some embodiments, the method may further include generating a second request to a remote server by the web browser and using the script, where the second request may include the requested information sent to the web browser. The first request and the second request may be, for example, HTTP requests. In some embodiments, the remote server may include an identity provider server, and the second request may include a request for single sign-on user authorization. In some embodiments, the remote server may include a service provider server, and the second request may include a request for accessing the service provider server.

In some embodiments, the application may include instructions that, when executed by the client device, cause the client device to open a server socket, bind the server socket to a local Internet Protocol (IP) address and a port, and listen for the first request from the web browser at the port. In some embodiments, the script includes a script in the JavaScript® programming language.

In some embodiments, the requested information may be stored in a memory device on the client device. The requested information may include information for authenticating the client device. The requested information may further include information for authenticating a particular user of the client device. The information for authenticating the client device may include at least one of a basic input/output system universal unique identifier, an operating system product identification number, a system software configuration, a system hardware configuration, a system serial number, a hard disk serial number, a multiple access control address, an IP address, a hostname, a local user account, an application specific client identification, or an access token.

According to certain embodiments, an endpoint device may include a memory device storing identification information, a web browser configured to execute on the endpoint device, and a local web server implemented on the endpoint device using an application. The web browser may be configured to load a webpage that includes a script configured to generate a first request to the local web server. The local web server may be configured to accept the first request from the web browser, retrieve the identification information from the memory device, and send the identification information to the web browser.

In some embodiments, the script may further be configured to generate a second request to a remote server, where the second request may include the identification information. The remote server may include an identity provider server for single sign-on user authorization, or a service provider server providing a web-based service. The identification information may include information for authenticating at least one of the endpoint device or a user of the endpoint device.

According to certain embodiments, a system may include a processing device and a non-transitory computer-readable medium communicatively coupled to the processing device. The processing device may be configured to execute program code stored in the non-transitory computer-readable medium and thereby perform operations including implementing a local web server, loading in a web browser a webpage independent of the web browser and including a script for generating a first request to the local web server, accepting the first request from the web browser at the local web server, and sending requested information to the web browser by the local web server.

In some embodiments, implementing the local web server may include opening a server socket, binding the server socket to a local Internet Protocol (IP) address and a port, and listening for the first request from the web browser at the port. In some embodiments, the requested information may include information for authenticating at least one of the system or a user of the system. In some embodiments, the operations may also include generating, by the web browser and using the script, a second request to a remote server, where the second request may include the requested information sent to the web browser. In some embodiments, the remote server may include an identity provider server for single sign-on user authorization, or a service provider server providing a web-based service.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which like reference numerals refer to like components or parts throughout the drawings.

DETAILED DESCRIPTION

Techniques disclosed herein relate generally to exchanging information with network devices using web browsers. More specifically, and without limitation, disclosed herein are techniques for exchanging information between a client device (e.g., an endpoint device or a local host) and a network using a webpage loaded in a browser and a light-weight local web server running on the client device. Techniques disclosed herein enable a web browser executing on a client device to automatically retrieve information associated with the client device from a local web server and send the retrieved information to a remote server for user authentication, authorization, or fingerprinting. Various inventive embodiments are described herein, including devices, systems, methods, non-transitory computer-readable storage media storing programs, code, or instructions executable by one or more processors, and the like.

As described above, Internet browsers (also referred to as web browsers or simply browsers) can play an important role in the field of information security because they are the most commonly used applications for communicating with the Internet, where most security threats may come from. Many security products, such as anti-virus software, parental control program, URL filtering application, and the like, may need to use the browsers to monitor, inspect, log, or control the network traffic for endpoint fingerprinting or other security purposes. Information exchange with a browser by a host machine may be performed using various techniques. For examples, in some implementations, a browser extension or plug-in module may be developed for a browser, where the browser extension or plug-in module, when loaded and executed by the browser, may read information from and/or write information to the browser, and exchange the information with the host machine and/or a backend server (e.g., a remote server). In some embodiments, the information exchange with the web browser can be performed using application programming interfaces (APIs) that the browser calls. In some implementation, information exchange with a browser can be performed by an agent that may intercept and manipulate packets sent from or to the browser. These techniques can be complicated, heavy weight, and operating system and/or browser dependent.

According to certain embodiments, certain information, such as system hardware and software information and/or user information, that may be used for user authorization or fingerprinting, may be exchanged on a local host machine (e.g., a client device) between a webpage loaded in a browser and an application running on the local host machine. The application may create an embedded local web server that listens on a local port for incoming connection requests. The webpage may include scripts to initiate an HTTP connection request to the local web server through the local port. After the connection is established, the browser and the application (e.g., the local web server) can send/ receive information to/from each other. The browser may use the information received from the local web server, for example, for single sign-on (SSO) user authentication or user fingerprinting.

Because the information exchange is performed using a webpage with scripts that, unlike a browser extension or plug-in module that is browser dependent, can be browser agnostic and operating system (or platform) independent, the techniques disclosed herein can be implemented independent of the browser and the operating system. In addition, unlike the techniques that use an agent to intercept and manipulate packets sent from or to the browser, techniques disclosed herein can be more efficient and have minimum or no impact on the performance of the browser. Furthermore, a light-weight local web server can be used to minimize the resources used by the application running on the client device (e.g., the local host machine).

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like), but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, or the like. When a process corresponds to a function, its termination may correspond to a return of the function to the calling function or the main function.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1:
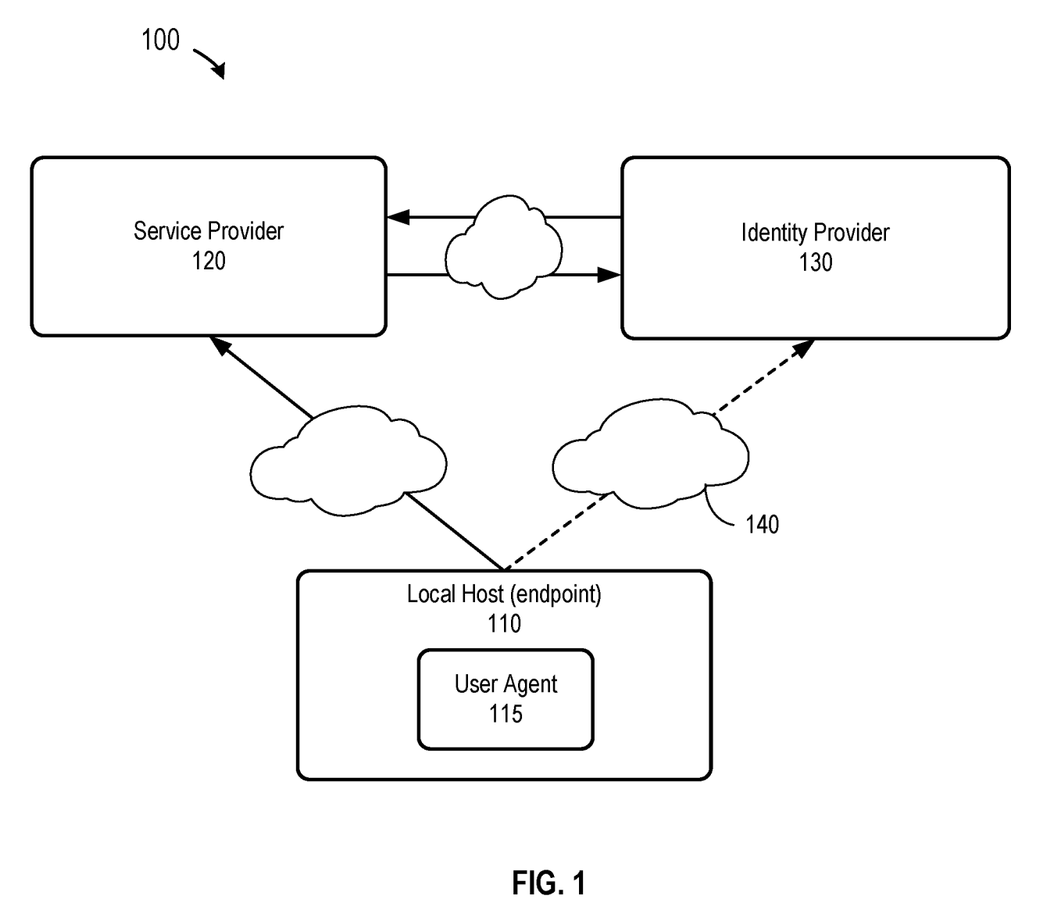
FIG. 1 illustrates an example of a system environment for user authorization or endpoint fingerprinting according to certain embodiments.

FIG. 1 illustrates an example of a system environment 100 for user authorization or endpoint fingerprinting according to certain embodiments. For example, system environment 100 may be used for single sign-on (SSO) user authorization that may allow a user or user device to access web-based services without re-entering credentials. System environment 100 may include one or more local hosts 110 (e.g., an endpoint device or other client devices), one or more service providers 120 (e.g., a remote server), and one or more identity providers 130 (e.g., an authorization server) that are connected through one or more networks 140.

Each service provider 120 may offer one or more services and may generally be protected by certain security measures. When a local host 110 needs to use the service provided by service provide 120, the security measures may request certain identification and/or authorization information from local host 110. For example, service provider 120 may identify the user based on the request from local host 110, and send an authentication request to identity provider 130. Identity provide 130 may store user information or attributes and may be responsible for the authentication process. In response to the request to authenticate a user device (e.g., local host 110) and/or a user, identity provider 130 may create an object that includes the information or attributes of the user and authentication information, which may be provided to a service provider 120 that requests the user information or user authentication. In some embodiments, identity provider 130 may also be an authorization server that may issue an access token after a successful authentication. Service provider 120 and identity provider 130 may include or take the form of a server computer system or device that operates in accordance with programming allowing the server to respond to requests from, provided services to, or otherwise interact with, client devices, such as local host 110. Service provider 120 and identity provider 130 may be provided by way of, or include or take the form of, one or more server computers (e.g., multiple computers or a distributed system).

Each local host 110 may be an endpoint device or another client device that may include any of various computing devices, such as desktop, laptop, or tablet computers, mobile devices, printers, smart televisions, a vehicle mounted processor, and the like. Each local host 110 can have a respective set of attributes, which may be used to identify and authorize the respective local host 110. The set of attributes of a local host 110 can include, for example, a basic input/output system universal unique identifier, an operating system product identification number, a system serial number, a hard disk serial number, a media access control (MAC) address, an interne protocol (IP) address, and/or a hostname. In some circumstances, one or more of these attributes may be shared by two or more local hosts 110 connectable to a network, and thus one attribute alone may be insufficient to uniquely identify a given local host 110. Therefore, a combination of these attributes may be used for unique identification of each local host 110. Local host 110 may use a user agent 115 to communicate with service provider 120 and identity provider 130 using one or more protocols. In many applications, user agent 115 includes a web browser. In some circumstances, the user device may be a shared device that multiple users can log on, and thus the attributes may include not only information regarding the user device but also information regarding a particular user that log on the user device, such as information regarding a local user account associated with the particular user.

Each local host 110 may be configured to engage in communication with a service provider 120 by contacting service provider 120 to obtain information, data, or services. Service provider 120 may respond to those requests, including providing information, data, or services to local host 110 making the request. In many implementations, before providing the requested services, service provider 120 may need information to authenticate or authorize local host 110, such as an access token issued by identity providers 130 that authenticates or authorizes local host 110. For example, service provider 120 may receive a request from a local host 110, extract some information from the request, send the extracted information to identity provider 130, which may then authenticate local host 110 and/or the particular user and generate an access token.

Networks 140 may include any of a variety of wireless and/or wired networks or communication links, such as optical fiber cables or other buses. Networks 140 may include two or more different types of networks or communication links, or can be of the same type. Although shown to be distinct networks or communication links in FIG. 1, networks 140 can also be one or more portions of a network or communication link(s). More particularly, any network 140 can take the form of, or include, an intranet or private network, one or more proprietary communication links, or a part of the Internet (or the World Wide Web). Networks 140 can employ any of a variety of network and communication link technologies including, for example, a cellular network, a local area network (LAN), a wide area network (WAN), a wireless local area network (WLAN), Wi-Fi communication links or access points, a metropolitan area network (MAN), a public telephone switched network (PSTN), a Bluetooth network, a ZigBee network, a near field communication (NFC) link, a cable network, a wireline network, an optical fiber network, a telecommunication network or the like, or any combination thereof.

Figure 2:
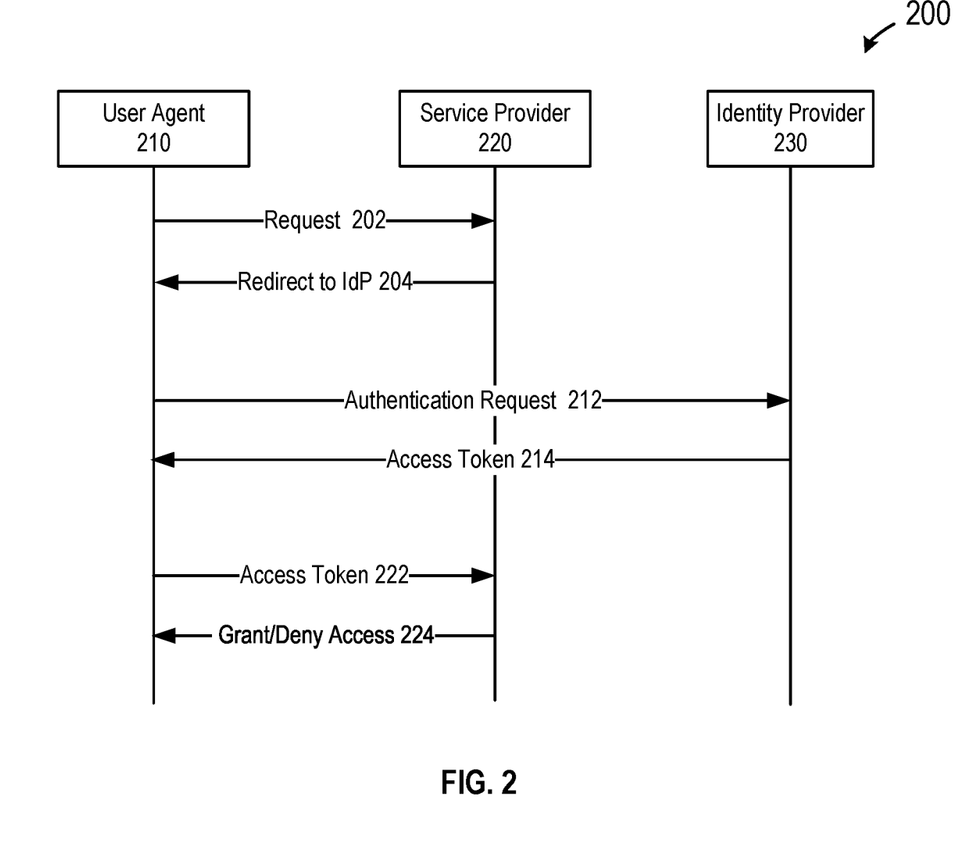
FIG. 2 is a simplified flow diagram illustrating an example of a method for user authorization or authentication according to certain embodiments.

FIG. 2 is a simplified flow diagram 200 illustrating an example of a method for user authorization or authentication according to certain embodiments. The method illustrated in flow diagram 200 may be used, for example, for single sign-on (SSO) user authentication. It is noted that the method shown on FIG. 2 is only one example of a single sign-on process. In other embodiments, different processes or protocols may be used for the single sign-on process.

In the example shown in FIG. 2, a user agent 210 (e.g., a web browser) running on a user device (e.g., local host 110) may attempt to access a service provider 220 by sending a request to service provider 220 at operation 202. If user agent 210 does not provide a valid access token, service provider 220 may redirect user agent 210 to an identity provider 230 at operation 204. In some embodiments, if the request at operation 202 includes some information regarding the user and/or the user device on which user agent 210 executes, service provider 220 may extract the information and send the information in a request to identity provider 230 for user authentication.

Optionally, at operation 212, user agent 210 may make an authentication request to identity provider 230. As described above, in some embodiments, service provider 220 may make the authentication request to identity provider 230. User agent 210 or service provider 220 may send a plurality of attributes associated with the user device and/or the user for user authentication and authorization or endpoint fingerprinting. The attributes may include, for example, the basic input/output system universal unique identifier, operating system product identification number, system software and/or hardware configuration, system serial number, hard disk serial number, MAC address, IP address, hostname, local user account, application specific client identification, and the like. As described in detail below, user agent 210 may retrieve and select the plurality of attributes from a local web server on the user device. Any number or any combination of the plurality of attributes, such as two or more attributes, can be selected. The attributes may be sent to identity provider 230 in, for example, an HTTP request.

At operation 214, identity provider 230 may authenticate and/or authorize the user and/or user device based on matching between the received attributes from user agent 210 and information stored by identity provider 230, such as attributes of registered or authorized users and/or user devices. If a match is found and the user and/or user device is authenticated, identity provider 230 may generate an access token and send the access token to user agent 210. Identity provider 230 may generate the access token in any of a number of manners, such as in a randomized manner or based upon some or all of the user device and/or user information. The access token may be time limited and thus may be valid only in a certain time period. User agent 210 may store the access token (and the time limit) locally for use in later service requests. In some embodiments, if a match is not found, identity provider 230 may register the user or user device using the attributes associated with the user and/or user device and/or request the user to login.

At operation 222, user agent 210 may send the access token to service provider 220, which may either grant or deny the access by user agent 210 at operation 224 based on determining that the access token is valid or invalid (e.g., expired or having insufficient level of access authorization). After the access to service provider 220 is granted, user agent 210 may securely communicate with service provider 220 as long as the time period of the access token has not expired. In some embodiments, upon the expiration of the time period associated with the access token, user agent 210 may request a renewal of the access token by sending a renewal request to identity provider 230 directly or through service provider 220, where the renewal request may include the attributes of the user and/or the user device as described above with respect to operation 212. Upon receiving the renewal request, identity provider 230 may compare the received attributes with information stored at identity provider 230 to determine whether any system information change has occurred. If it is determined that no system information change has been observed as of the time of (e.g., during) the token renewal request, identity provider 230 may again authenticate the user and/or user device and renew or regenerate an access token.

As described above, user agent 210 may need to retrieve attributes associated with the user device and/or user. The attributes may include any information that may be used to identify, differentiate, or describe the user device and/or the particular user using the user device if the user device can be used by multiple users. For example, the user device may be a shared device that multiple users can log on and use, and thus the attributes may include not only information regarding the user device but also information regarding a particular user that log on the user device, such as information regarding a local user account associated with a particular user. It is generally desirable that user agent 210 can automatically retrieve the relevant information without human intervention or human inputs.

According to certain embodiments, to exchange information with a user agent, for example, to retrieve the relevant information associated with a user device and/or a user, a host application may execute on the user device to create an embedded local web server that listens on a local port for incoming connection request. The user agent (e.g., a web browser) may load a webpage that may include scripts for initiating an HTTP connection request to the local web server through the local port. After the request is validated and accepted and the connection is established, the browser and the host application may send information to or receive information from each other.

Figure 3:
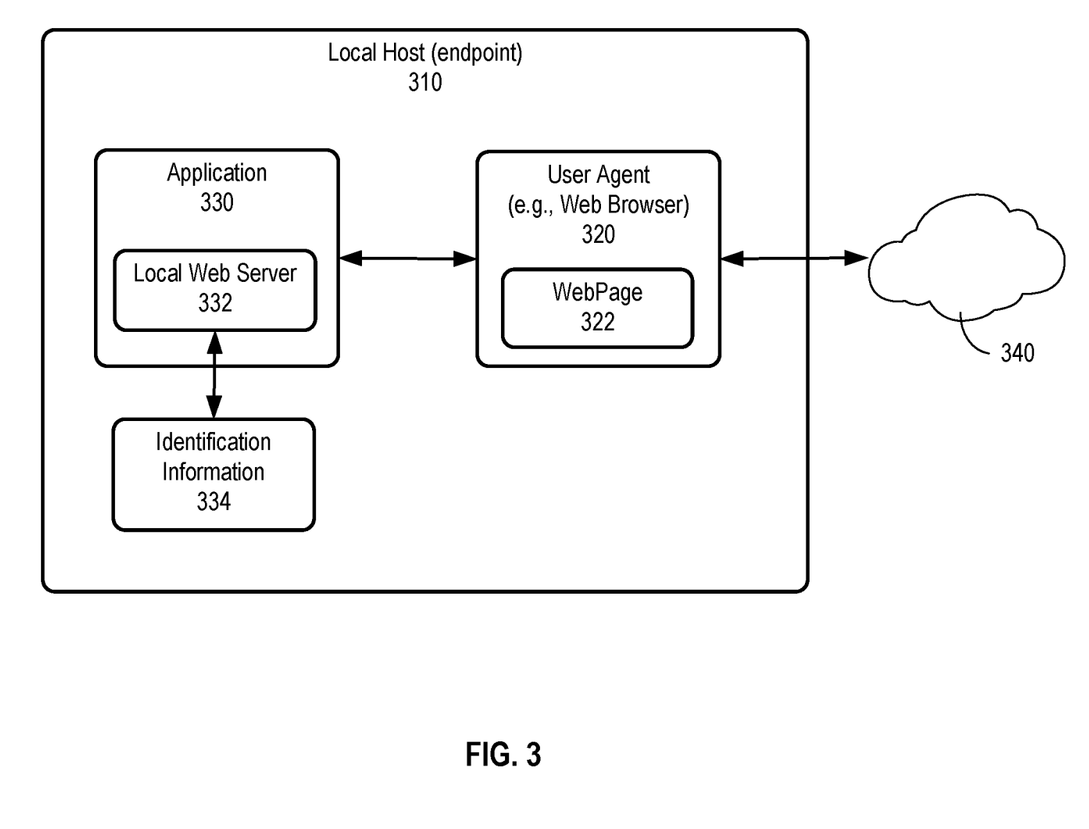
FIG. 3 illustrates a simplified block diagram of an example of a local host that uses a web browser and a local web server to automatically retrieve information associated with the local host and send the retrieved information to a remote server according to certain embodiments.

FIG. 3 illustrates a simplified block diagram of an example of a local host 310 (e.g., an endpoint device) that uses a user agent 320 (e.g., a web browser) and a local web server 332 to automatically retrieve information (e.g., identification information) on the local host and send the retrieved information to a remote server according to certain embodiments. User agent 320 can be any web browsers, such as any commercially available or proprietary browsers or other software applications that can access information on a network, such as webpages, images, and videos in the World Wide Web (WWW) identified by a Uniform Resource Identifier (URI) (e.g., a Uniform Resource Locator (URL)). For example, user agent 320 may access the information using the Hypertext Transfer Protocol (HTTP) or secured HTTP, and may be able to interpret markup languages (e.g., Hypertext Markup Language (HTML)), style sheet languages (e.g., Cascading Style Sheets (CSS)), and scripting languages (e.g., programming language). User agent 320 may load a webpage 322 that includes a script for establishing a connection with a server. For example, the script may open a new client socket and then connect the client socket to a server using an IP address and port pair.

Local host 310 may execute a local application 330 (or a service or daemon) for exchanging the information or attributes described above with user agent 320. Local application 330 may start the light-weight local web server 332, which may use minimum system resource and may listen on a local port for incoming connection request. For example, local web server 332 may open a server socket and bind the server socket to a local IP address and a listen port. Local web server 332 may then listen for incoming connection requests on the listen port. When a connection request is received at the listen port, local web server 332 may validate and accept the connection request to establish a connection (e.g., an HTTP session) between local web server 332 and user agent 320. Once the connection is established, local web server 332 and user agent 320 may exchange any information with each other. For example, local web server 332 may retrieve identification information 334 stored on local host 310, for example, in a volatile or non-volatile memory. As described above, identification information 334 may be associated with local host 310 and/or a specific user, and may include information for uniquely identifying local host 310 and the specific user, such as the basic input/output system universal unique identifier, operating system product identification number, system software and/or hardware configuration, system serial number, hard disk serial number, MAC addresses, IP addresses, hostname, local user account, application specific client identification, an access token, and the like.

User agent 320, upon receiving identification information 334, may generate an HTTP request that includes at least some of identification information 334 to a remote server, such as service provider 120 or 220 or identity provider 130 or 230, through a network 340. Network 340 may be any network as described above with respect to network 140. When the communication is complete, user agent 320 and local web server may close the sockets or open new socket. For example, closing the client socket may end the connection (e.g., the HTTP session), and closing the server socket may stop the listening process.

Figure 4:
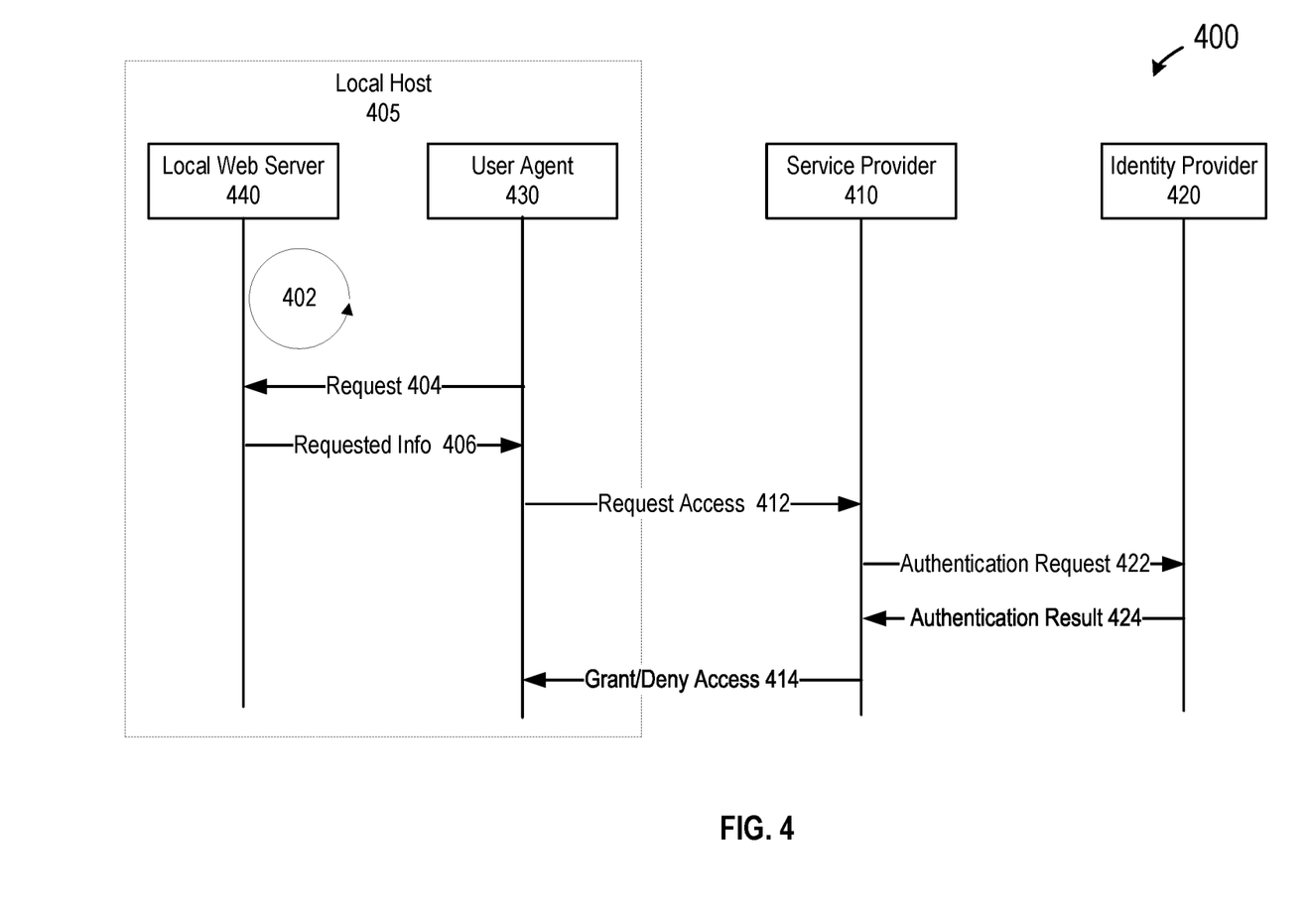
FIG. 4 is a simplified flow diagram illustrating an example of a method for retrieving information on a local host and communicating the information with a remote server according to certain embodiments.

FIG. 4 is a simplified flow diagram 400 illustrating an example of a method for retrieving information on a local host 405 and communicating the information with one or more remote servers according to certain embodiments. Local host 405 may be an endpoint device or another client device as describe above, such as local host 110 or 310, and may include a local web server 440 and a user agent 430. Local web server 440 may be similar to local web server 332 and may be implemented using a local application (e.g., local application 330). Local web server 440 may be able to provide requested information based on the requests from user agent 430, such as identification information 334 associated with the local host and/or a particular user. User agent 430 may be a web browser, and may load a specially designed webpage that may include some scripts for establishing connections (e.g., HTTP sessions) with servers as described above with respect to user agent 320.

At operation 402, the local application may implement local web server 440, which may open a server socket, bind the server socket to a pair of a local IP address and a listen port, and listen at the listen port for incoming connection requests. At operation 404, user agent 430 may load a webpage that includes scripts for establishing HTTP connections and exchanging information with local web server 440 and remote servers. For example, user agent 430 may execute the scripts to send a connection request to local web server 440 based on the pair of the local IP address and the listen port bound to the server socket. At operation 406, local web server 440 may accept the connection request to establish an HTTP connection with user agent 430 and send requested information, such as identification information 334 or other requested information, to user agent 430.

At operation 412, user agent 430 may sent an HTTP request including at least some of the information received from local web server 440 to a service provider 410. If the information includes a saved access token, service provider 410 may determine whether the access token is valid. If the information does not include an access token (e.g., an access token has not been generated for local host 405), service provider 410 may send the information in an authentication request to an identity provider 420 at operation 422. Identity provider 420 may authenticate local host 405 as described above with respect to FIGS. 1 and 2, generate an access token, and send the access token to service provider 410 (and/or local host 405) at operation 424. Service provider 410 may either grant or deny the access by user agent 430 at operation 414 based on determining that the access token is valid or invalid (e.g., expired or having insufficient level of access authorization).

Figure 5:
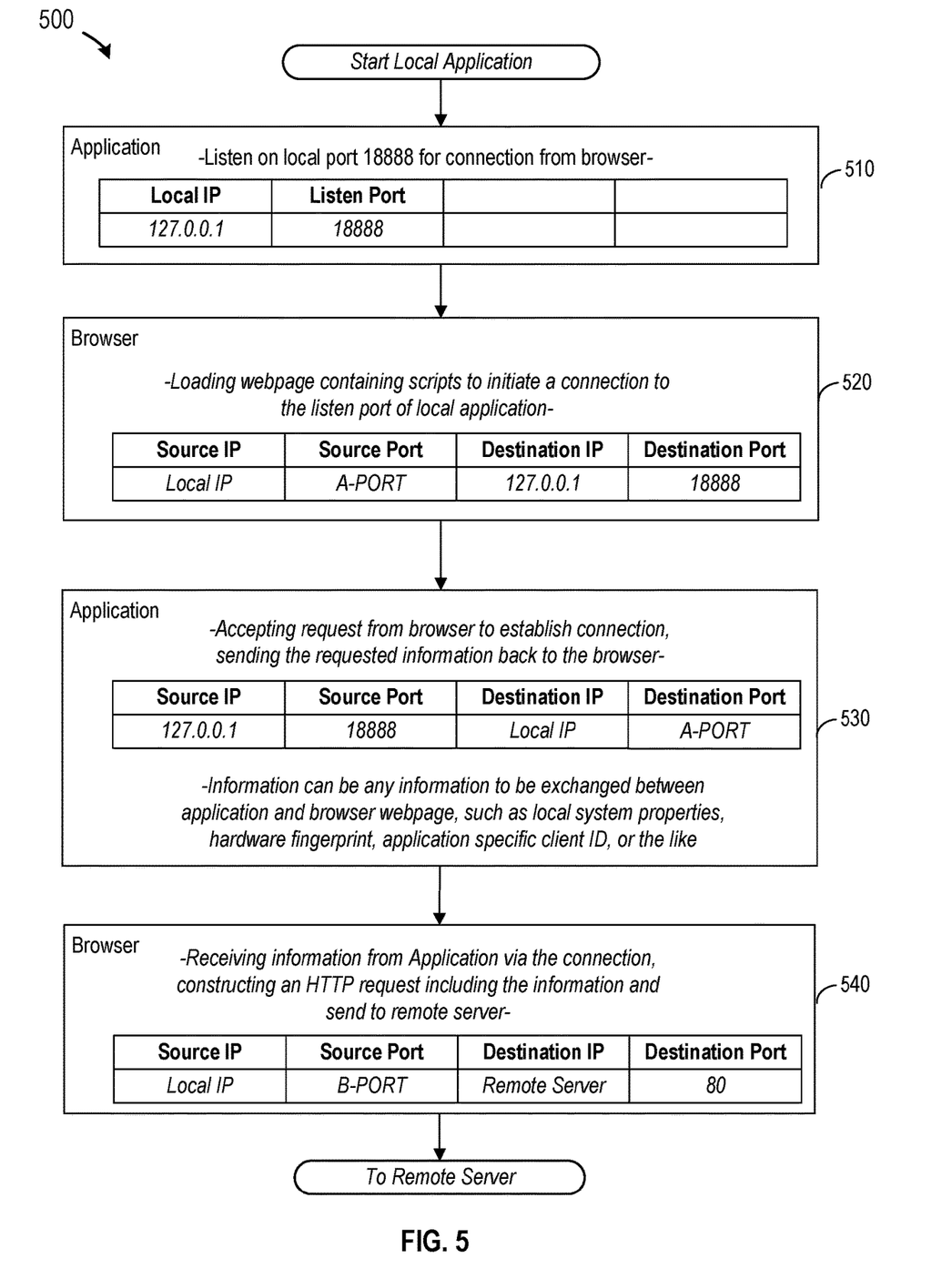
FIG. 5 is a simplified flow chart illustrating an example of a method for retrieving information associated with a client device and communicating the information with a remote server according to certain embodiments.

FIG. 5 is a simplified flow chart 500 illustrating an example of a method for retrieving information associated with a client device and communicating the information with a remote server according to certain embodiments. The processing depicted in FIG. 5 may be examples of the operations described above with respect to FIG. 4. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In some embodiments, the processing described in FIG. 5 may be performed by, for example, local host 110, 310, or 405, and more specifically, user agent 115, 210, 320, or 430, local application 330, and/or local web server 332 or 440.

At block 510, a local host may execute a local application (or a service or daemon) for exchanging information with a user agent (e.g., a web browser), such as local application 330. For example, the local application may implement a light-weight local web server, which may use minimum system resource and may listen on a local port for incoming connection requests. In the example shown in FIG. 5, the local web server may open a server socket and bind the server socket to a local IP address 127.0.0.1 and a listen port 18888. The local web server may then listen on listen port 18888 for incoming connection requests.

At block 520, a user agent (e.g., a web browser) may load a webpage including a script for establishing a connection with the local web server. For example, the script may open a new client socket and then connect the client socket to the local web server using the IP address and the port bound to the server socket. In the example shown in FIG. 5, the web browser may send an HTTP request to the local web server, where the request may include a source IP address (e.g., the local IP address of the webpage or web browser), a source port (e.g., A-port), a destination IP address (e.g., the local IP address of the local web server 127.0.0.1), and a destination port (e.g., the listen port 18888 on the local web server).

At block 530, the local web server may validate and accept the HTTP request from the web browser to establish an HTTP session. The local web server may send information requested by the web browser to the web browser or receive information from the web browser through the HTTP session. For example, the information sent from the local web server to the web browser may be included in one or more packets, where a header of the one or more packets may include a source IP address (e.g., the local IP address of the local web server 127.0.0.1), a source port (e.g., the listen port 18888), a destination IP address (e.g., the local IP address of the webpage or web browser), and a destination port (e.g., A-port). As described above, the information exchanged may include any information that needs to be exchanged between the local application and the web browser, such as local system properties, hardware fingerprint, application specific client identification, and the like. For example, the information may include any combination of the basic input/output system universal unique identifier, operating system product identification number, system software and/or hardware configuration, system serial number, hard disk serial number, MAC addresses, IP addresses, hostname, local user account, application specific client identification, an access token, and the like.

At block 540, the web browser and the script may receive the requested information from the local web server, package the information in an HTTP request that may include one or more packets, and send the HTTP request to a remote server, such as a service provider server or an identity provider server. A header of the one or more packets may include a source IP address (e.g., the IP address of the local host), a source port (e.g., B-port), a destination IP address (e.g., the IP address of the remote server), and a destination port (e.g., port 80 of the remote server). The remote server, upon receiving the HTTP request, may grant or deny the request as described above with respect to, for example, operations 422, 424, and 414.

Figure 6:
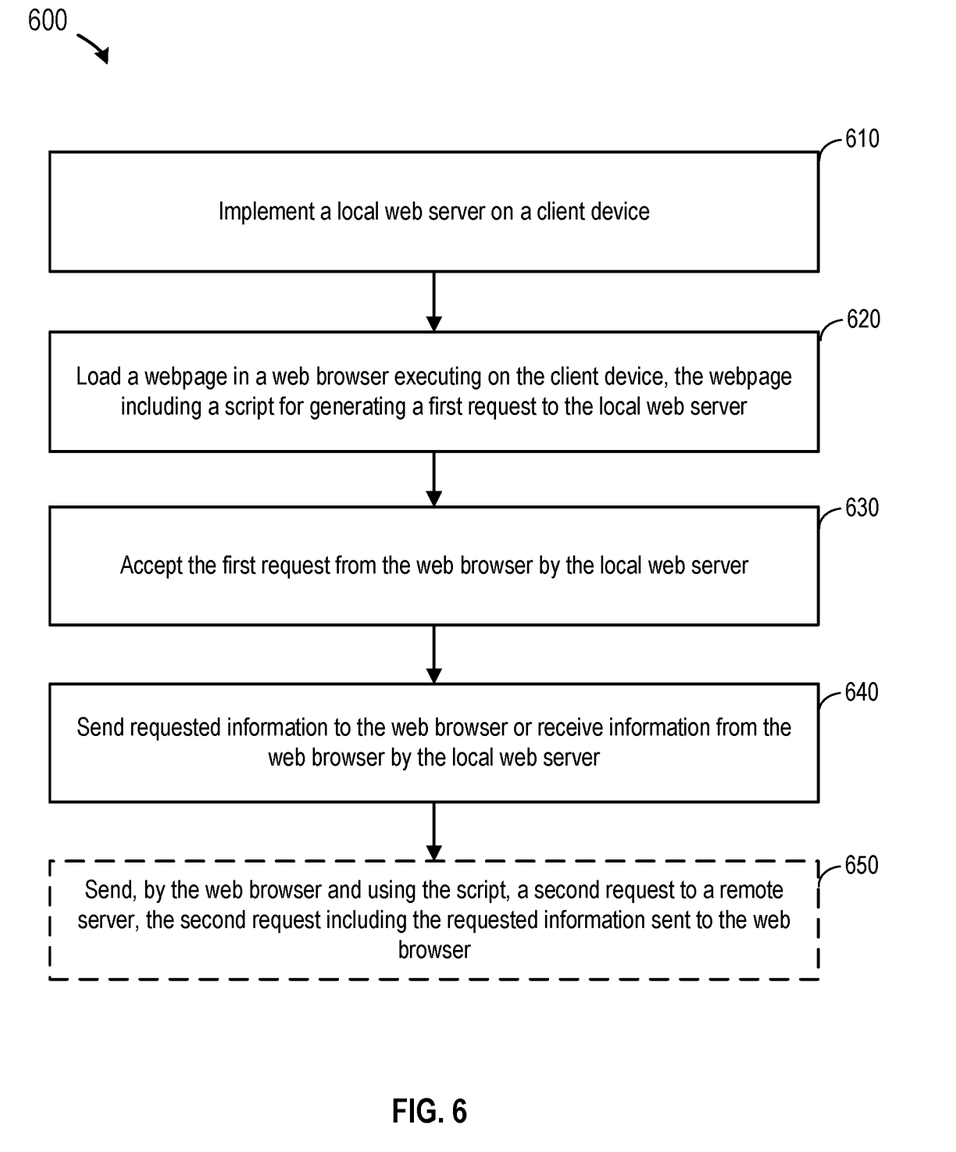
FIG. 6 is a simplified flow chart illustrating an example of a method for exchanging information between a web browser and a local web server on a client device according to certain embodiments.

FIG. 6 is a simplified flow chart 600 illustrating an example of a method for exchanging information between a web browser and a local web server on a client device according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 6 and described below is intended to be illustrative and non-limiting.

Although FIG. 6 depicts the various processing steps occurring in a particular sequence or order, this is not intended to be limiting. In certain alternative embodiments, the steps may be performed in some different order or some steps may also be performed in parallel. In some embodiments, the processing described in FIG. 6 may be performed by, for example, local host 110, 310, or 405, and more specifically, user agent 115, 210, 320, or 430, local application 330, and/or local web server 332 or 440.

At block 610, a client device may execute an application to implement a local web server on the client device. The application may include instructions that, when executed by the client device, cause the client device to open a server socket, bind the server socket to a local Internet Protocol (IP) address and a port, and listen for the first request from the web browser at the port.

At block 620, the client device may load a webpage in a web browser executing on the client device, where the webpage may include a script for generating a first request to the local web server. The first request may be, for example, an HTTP request. The script may include a script in the JavaScript® programming language.

At block 630, the local web server may accept the first request from the web browser. At block 640, the local web server may send requested information to the web browser. or receive information from the web browser. The requested information may be stored in a memory device on the client device. The requested information may include information for authenticating the client device. The requested information may also include information for authenticating a particular user of the client device. The information for authenticating the client device may include at least one of a basic input/output system universal unique identifier, an operating system product identification number, a system software configuration, a system hardware configuration, a system serial number, a hard disk serial number, a multiple access control address, an IP address, a hostname, a local user account, an application specific client identification, or an access token.

Optionally, at block 650, the web browser may use the script to send a second request to a remote server, where the second request may include the requested information sent to the web browser by the local web server. In some embodiments, the remote server may include an identity provider server, and the second request may include a request for single sign-on user authorization. In some embodiments, the remote server may include a service provider server, and the second request may include a request for accessing the service provider server.

Figure 7:
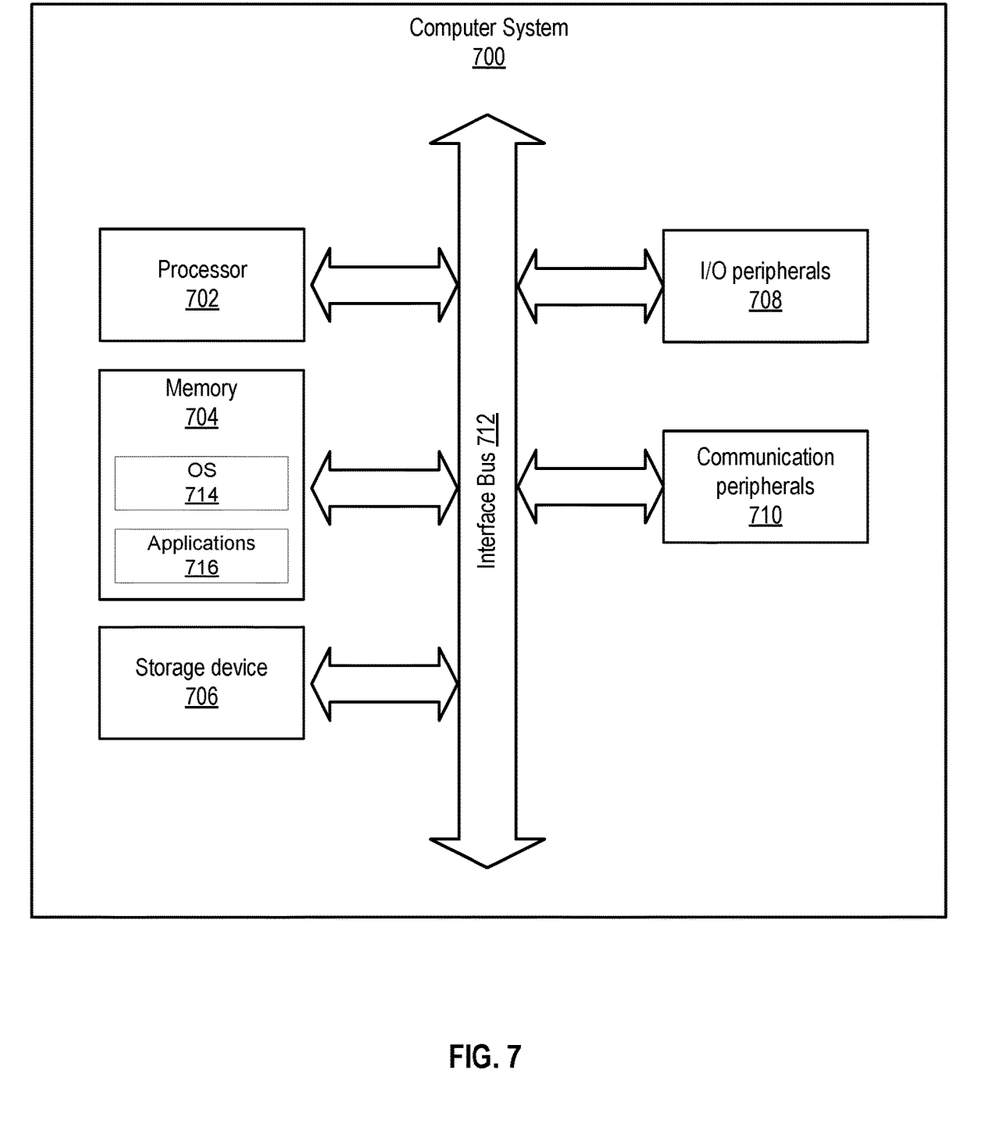
FIG. 7 is a simplified block diagram of an example of a computer system for implementing some techniques disclosed herein according to certain embodiments.

FIG. 7 illustrates an example computer system 700 for implementing some of the embodiments disclosed herein. For example, computer system 700 may be used to implement any of the cloud server, security operation center, security server, vehicle electronic system, ADCs, and ECUs described above. Computer system 700 may have a distributed architecture, where some of the components (e.g., memory and processor) are part of an end user device and some other similar components (e.g., memory and processor) are part of a computer server. Computer system 700 includes at least a processor 702, a memory 704, a storage device 706, input/output (I/O) peripherals 708, communication peripherals 710, and an interface bus 712.

Interface bus 712 is configured to communicate, transmit, and transfer data, controls, and commands among the various components of computer system 700.

Processor 702 can include without limitation one or more general-purpose processors, one or more special-purpose processors, and/or other processing structure or means, which can be configured to perform one or more of the methods described herein. For example, processor 702 is intended to be representative of any one or more of a microprocessor, a central processing unit (CPU), a controller, a microcontroller unit, an application-specific integrated circuit (ASIC), an application-specific instruction-set processor (ASIP), a graphics processing unit (GPU), a digital signal processor (DSP), a field programmable gate array (FPGA), a programmable logic device (PLD), a physics processing unit (PPU), a reduced instruction-set computer (RISC), or the like, or any combination thereof. Processor 702 can be configured to execute program instructions including, for example, instructions provided via software, firmware, operating systems, applications, or programs, and can be configured for performing any of a variety of processing, computational, control, or monitoring functions. Examples of processor 702 may include processors developed by ARM®, MIPS®, AMD®, Intel®, Qualcomm®, and the like.

Memory 704 and storage device 706 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 704 and storage device 706 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 700.

Further, memory 704 includes an operating system 714, programs, and applications 716. Processor 702 is configured to execute the stored instructions and includes, for example, a logical processing unit, a microprocessor, a digital signal processor, and other processors.

Memory 704 and/or processor 702 can be virtualized and can be hosted within another computing systems of, for example, a cloud network or a data center. I/O peripherals 708 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 708 are connected to processor 702 through any of the ports coupled to interface bus 712.

Communication peripherals 710 are configured to facilitate communication between computer system 700 and other computing devices over a communications network and include, for example, a modem, a network card, an infrared communication device, a wireless communication device, a near-field communication (NFC) device, and/or a chipset (such as a Bluetooth device, an International Electrical and Electronics Engineers (IEEE) 802.11 device (e.g., a device utilizing one or more of the 802.11 standards described herein), an IEEE 802.15.4 device, a WiFi device, a WiMax device, cellular communication facilities, etc.), and/or the like. Depending on the desired functionality, communication peripherals 710 can include separate transceivers to communicate with antennas of base transceiver stations and other wireless devices and access points as described above, which may include communicating with different data networks and/or network types, such as wireless wide-area networks (WWANs), wireless local area networks (WLANs), or wireless personal area networks (WPANs). A WWAN may be a network using any air interface technology, for example, a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, W-CDMA, and so on. Cdma2000 includes IS-95, IS-2000, and/or IS-856 standards. A TDMA network may implement GSM, Digital Advanced Mobile Phone System (D-AMPS), or some other RATs. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

It should be appreciated that computer system 700 is illustrative and not intended to limit embodiments of the present disclosure. Many other configurations having more or fewer components than computer system 700 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including, but not limited to, Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising:
   executing, by a client device, an application for implementing a local web server on the client device;
   loading, by a web browser executing on the client device, a webpage independent of the web browser, such that the webpage is browser agnostic and operating system independent, and including a script for generating a first request to the local web server for authentication attributes of the user and/or user device for user authentication, authorization, or fingerprinting;
   obtaining, by the local web server, authentication attributes of the user and/or user device:
   storing, by the local web server, the authentication attributes:
   opening a server socket;
   binding the server socket to a local Internet Protocol (IP) address and a port; and
   listening for the first request from the web browser at the port;
   accepting, at the local web server, the first request from the web browser; and
   sending, by the local web server, the authentication attributes of the user and/or user device to the web browser; and
   sending, by the web browser using the script, a second request with the authentication attributes of the user and/or user device to a remote server for user authentication, authorization, or fingerprinting.

2. The method of claim 1, wherein:
   the local web server is a light-weight web server with capability to open a server socket, binding the server socket to a local Internet Protocol (IP) address and a local port, listen on a local port for incoming connection requests, retrieve information associated with the client device, send/receive information to/from the web browser.

3. The method of claim 2, wherein the first request and the second request are HTTP requests.

4. The method of claim 2, wherein:
   the remote server includes an identity provider server; and
   the second request includes a request for single sign-on user authorization.

5. The method of claim 2, wherein:
   the remote server includes a service provider server; and
   the second request includes a request for accessing the service provider server.

6. The method of claim 1, wherein the authentication attributes include at least one of a basic input/output system universal unique identifier, an operating system product identification number, a system software configuration, a system hardware configuration, a system serial number, a hard disk serial number, a multiple access control address, an IP address, a hostname, a local user account, an application specific client identification, or an access token.

7. The method of claim 1, wherein the script is in a scripting language.

8. The method of claim 1, wherein the authentication attributes are stored in a memory device on the client device.

9. An endpoint device comprising:
   a memory device storing identification information;
   a web browser configured to execute on the endpoint device; and
   a local web server implemented on the endpoint device using an application,
   wherein the web browser is configured to load a webpage that is browser agnostic and operating system independent, and includes a script, the script configured to generate a first request to the local web server for authentication attributes of the user and/or user device for user authentication, authorization, or fingerprinting; and
   wherein the local web server is configured to:
      obtain authentication attributes of the user and/or user device;
      store the authentication attributes:
      open a server socket;
      bind the server socket to a local Internet Protocol (IP) address and a port;
      listen for the first request from the web browser at the port;
      accept the first request from the web browser;
      retrieve the identification information from the memory device;
   send the identification information to the web browser; and
      send, by the web browser using the script, a second request with the authentication attributes to a remote server for user authentication, authorization, or fingerprinting.

10. The endpoint device of claim 9, wherein the local web server is a light-weight web server with capability to open a server socket, binding the server socket to a local Internet Protocol (IP) address and a local port, listen on a local port for incoming connection requests, retrieve information associated with the client endpoint device, send/receive information to/from the web browser.

11. The endpoint device of claim 10, wherein the remote server includes:
   an identity provider server for single sign-on user authorization; or
   a service provider server providing a web-based service.

12. The endpoint device of claim 9, wherein the identification information includes information for authenticating at least one of the endpoint device or a user of the endpoint device.

13. A system comprising:
   a processing device; and
   a non-transitory computer-readable medium communicatively coupled to the processing device, wherein the processing device is configured to execute program code stored in the non-transitory computer-readable medium and thereby perform operations comprising:
      implementing a local web server;
         loading, in a web browser, a webpage independent of the web browser, such that the webpage is browser agnostic and operating system independent, and including a script for generating a first request to the local web server for authentication attributes of the user and/or user device for user authentication, authorization, or fingerprinting;
      obtaining, by the local web server, authentication attributes of the user and/or user device;
      storing, by the local web server, the authentication attributes;
      opening a server socket;
      binding the server socket to a local Internet Protocol (IP) address and a port;
      listening for the first request from the web browser at the port;
      accepting, at the local web server, the first request from the web browser;
   sending, by the local web server, the authentication attributes to the web browser; and
      sending, by the web browser using the script, a second request with the authentication attributes to a remote server for user authentication, authorization, or fingerprinting.

14. The system of claim 13, wherein the authentication attributes include information for authenticating at least one of the system or a user of the system.

15. The system of claim 13, wherein the operations further comprise generating, by the web browser and using the script, a second request to a remote server, the second request including the authentication attributes sent to the web browser.

16. The system of claim 15, wherein the remote server includes:
   an identity provider server for single sign-on user authorization; or
   a service provider server providing a web-based service.

* * * * *